United States Patent [19]

Norris

[11] 4,275,414

[45] Jun. 23, 1981

[54] TUBE PLUG WELD INSPECTION APPARATUS

[75] Inventor: George W. Norris, Wilkins Twp., Allegheny County, Pa.

[73] Assignee: Westinghouse Electric Corp., Pittsburgh, Pa.

[21] Appl. No.: 932

[22] Filed: Jan. 4, 1979

[51] Int. Cl.² ............................................. H04N 7/18
[52] U.S. Cl. .................................. 358/100; 356/241; 358/225
[58] Field of Search ............... 358/100, 101, 108, 225; 356/237, 241

[56] References Cited

U.S. PATENT DOCUMENTS

| 2,215,900 | 9/1940  | Bitner . |         |
|-----------|---------|----------|---------|
| 2,254,962 | 9/1941  | Harris . |         |
| 2,454,144 | 11/1948 | Epstein .|         |
| 2,482,698 | 9/1949  | Tillyer .|         |
| 2,510,521 | 6/1950  | Rinia .  |         |
| 2,588,414 | 3/1952  | Rosin .  |         |
| 3,010,366 | 11/1961 | Crawford .|        |
| 3,320,359 | 5/1967  | Ikegami  | 358/100 |
| 3,669,527 | 6/1972  | Fuller   | 350/189 |
| 3,958,080 | 5/1976  | Schadler | 358/100 |

Primary Examiner—Howard W. Britton
Attorney, Agent, or Firm—L. A. DePaul; Z. L. Dermer

[57] ABSTRACT

Apparatus for remote inspection of annular curved ridge welds securing plugs in heat transfer tubes in a nuclear steam generator. Included in such apparatus is a small sized television camera, an annular image transformation lens of greater size than the observed weld for presenting a flattened expanded image of such weld to the camera, a circular array of work-illumination lamps at the input end of the camera, and a hollow cylindrical light conductive member mounted at its one end on the input end of the camera in exposure to the lamps and mounting the image transformation lens on its opposite end for proximity to the annular weld being inspected.

5 Claims, 7 Drawing Figures

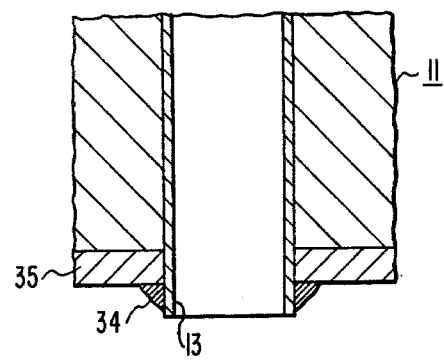
FIG. 2
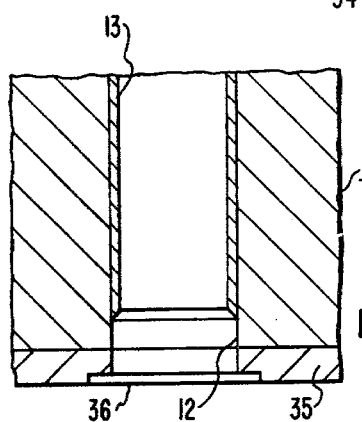
FIG. 3
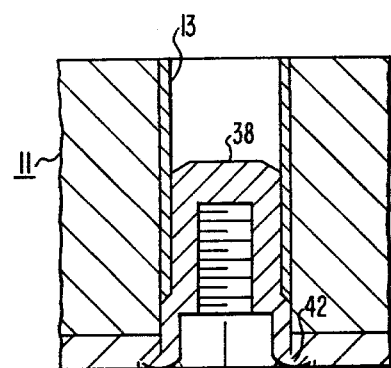
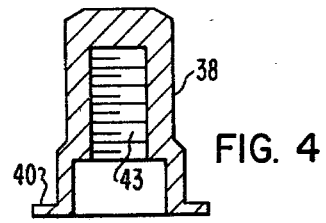
FIG. 4
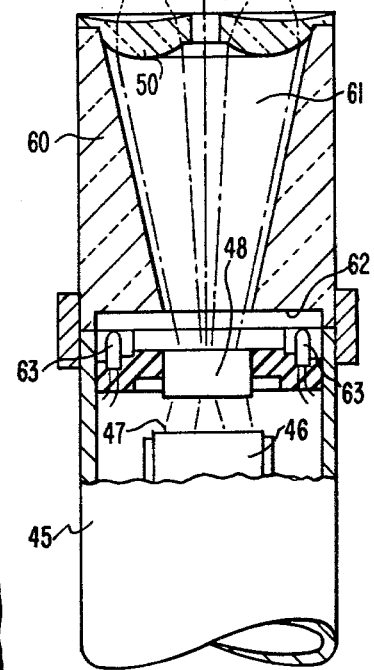
FIG. 5
FIG. 6
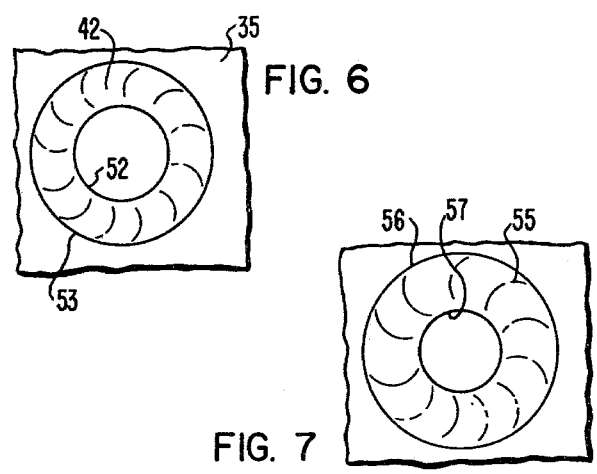
FIG. 7

TUBE PLUG WELD INSPECTION APPARATUS

CROSS-REFERENCE TO RELATED APPLICATIONS

The invention described herein can be related to commonly-assigned U.S. applications Ser. Nos. 806,232 and 806,233 filed June 13, 1977 of Robert H. Sturges, Jr. and D. R. Riffe, respectively, on remote access manipulators.

BACKGROUND OF THE INVENTION

This invention relates to apparatus for repairing a steam generator in a nuclear power plant, and more particularly to apparatus for inspecting annular welds at plugged ends of heat exchanger tubes in such steam generator.

It is a practice in the repair of nuclear steam generators to close off leak-prone heat exchanger, heat transfer, tubes by welding closure plugs via use of manipulator apparatus disposed within the lower end of the steam generator beneath the tubesheet, under control of personnel located outside such generator. In furthering the safeguards taken in connection with minimizing exposure of operating personnel to any radiation which may exist within the interior of the steam generator undergoing such repair, it becomes desirable to enable the operating personnel outside of the steam generator to remotely inspect the plug-securing welds made in the ends of the selected leak-prone ones of the heat exchanger tubes of such generator. To this end, the apparatus of the present invention is directed.

SUMMARY OF THE INVENTION

The tube plug weld inspection apparatus of the present invention is particularly adapted for inclusion in the previously mentioned manipulator apparatus, for inspection of the tube plug welds by use of a small cylindrical television camera having a pickup tube with an input screen substantially of no greater diameter than that of the welds undergoing inspection, together with an annular lens and light pipe assembly for illuminating the weld undergoing inspection and expanding its image to include all parts of such weld for observation by the camera tube by way of the front lens of the camera which may be of even lesser diameter than that of the pickup tube with which such lens is associated.

BRIEF DESCRIPTION OF THE DRAWINGS

In the drawings:

FIG. 2 is a fragmental section view showing a portion of the tubesheet employed in the steam generator of the type shown in FIG. 1 and including the lowermost open end of a heat exchanger tube included in the tube bundle of such steam generator;

FIG. 3 is a similar view showing the results of a machining step performed in the region of the lower end of the tube shown in FIG. 2 in preparation for introduction of a plug to be welded therein;

FIG. 4 is a cross-sectional view of a plug adapted for insertion into the lower end of the tube as prepared in accordance with the showing in FIG. 3;

FIG. 5 is a view partly in outline and partly in section showing the plug of FIG. 4 as welded in place to close the lower end of the heat exchanger tube as shown in FIG. 3, together with the inspection apparatus of the present invention for remotely inspecting the annular weld that secures such plug in place;

FIG. 6 is a plan view in outline showing the appearance of the annular weld of FIG. 5 as same would appear to the naked eye; and FIG. 7 is a plan view in outline of such weld as same appears to the camera tube of the apparatus of FIG. 5.

DESCRIPTION OF THE PREFERRED EMBODIMENT

Figure 1:
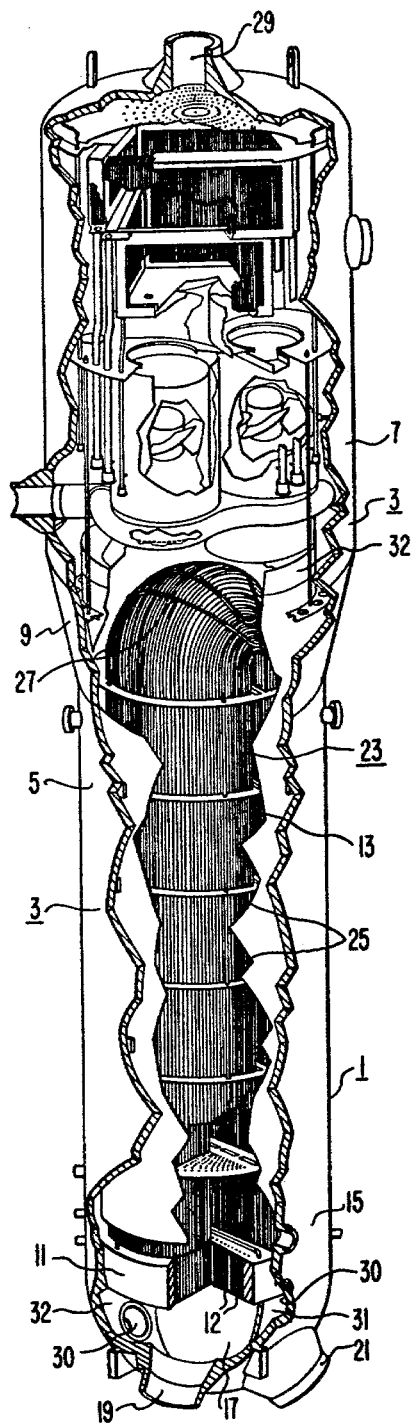
FIG. 1 is a vertical view, partly in outline and partly in section of a steam generator of the type employed in a nuclear steam power plant.

Referring to FIG. 1 in the drawings, the steam generator 1 with which the remote inspection apparatus of the present invention is intended to be employed in connection with the welding of tube plugs (not shown) typically includes a vertically oriented shell 3 having a lower cylindrical portion 5, an upper cylindrical portion 7, larger in diameter than the lower portion, and a frustoconical transition portion 9 joining the upper and lower portions 7 and 5. A tubesheet 11 is disposed in the lower end of the lower portion 5 of the shell and has a plurality of holes 12 for accommodating the ends of U-shaped heat exchange tubes 13 which extend upwardly from the tubesheet 11 and are closely packed to form the tube bundle 23 disposed vertically within the lower portion 5 of the shell 3.

A hemispherical channel head 15 is fastened to the tubesheet 11 and has a divider plate 17 disposed therein. A primary fluid inlet nozzle 19 supplies heated affluent primary fluid from a nuclear reactor core (not shown) to one portion of the channel head 15 and a discharge nozzle 21 is disposed in the channel head 15 to return the affluent primary fluid to such reactor core.

A plurality of support plates 25 are disposed throughout the tube bundle 23 to support the tubes 13 at various locations along their length to reduce flowinduced vibrations. Anti-vibration bars 27 are also disposed adjacent to the bends in the tubes 13 to prevent vibration in this portion of the tube bundle 23.

Typical operation of the steam generator, which per se forms no part of the present invention, involves the flow of heated primary fluid from a nuclear reactor core upwardly through the tubesheet 11 and one branch of the U-shaped tube bundle 23 and downwardly through the other branch of such tube bundle and back through the tubesheet 11 to the discharge nozzle 21, while secondary fluid above the tubesheet 11 and outside the tube bundle 23 becomes heated to form steam for conveyance via an outlet 29 to a turbine (not shown) operated by such steam.

Manways 30 are provided in the channel head 15 at the lower end of the steam generator to provide access to both the primary fluid inlet plenum 31 and primary fluid outlet plenum 32 at opposite sides of the divider plate 17 so that access may be had to the entire underside of the tubesheet 11.

Since the primary fluid contains radioactive particles and is isolated from the secondary fluid by the walls of the tubes 13 and the tubesheet 11, it is important that the tubes 13 and the tubesheet 11 be maintained defect-free so that no breaks will occur in the tubes 13 or in the welds (34 in FIG. 2) between the tubes 13 and the tubesheet 11 to prevent contamination of the secondary fluid by the primary fluid.

Occasionally, one or more of the heat transfer tubes 13 may become internally dented due to a variety of possible reasons. One such reason for the internal denting is thought to be corrosion on the outside of the tube which presses in on the tube and causes the internal flow area of the tube to become constricted. Not only does this denting phenomenon restrict the flow through the particular heat transfer tube, but it also may lead to a failure in the tube at the point of denting which can result in leakage of the primary fluid into the secondary fluid. Where only a limited number of heat exchanger tubes 13 thus become leaky, it is possible to plug the lower ends of such leaky tubes by use of specialized equipment introduced into the interior of the channel head 15 by way of the manways 30.

The lower end of any particular heat transfer tube 13 that may become leaky will appear as shown in FIG. 2 welded to the bottom of a layer 35 of Inconel cladding 35 bonded to the bottom of the tubesheet 11. A boring tool (not shown) is then introduced into the lower end of the selected tube 13 to be plugged and the lower end of such tube 13 is then machined away together with the welds 34, FIG. 2, previously affiliated with such lower end and an annular shoulder or socket recess 36 is formed in the cladding layer 35 to a limited depth in encirclement of the opening 12 in the tubesheet 11 through which the remainder of the tube 13 extends. The Inconel plug 38, FIG. 4, is then inserted into the machined opening 12 in the tubesheet 11 and into the lower end of the heat transfer tube 13 to be closed. A flange 40 at the lower end of the plug 38 fits into the annular recess 36 in the Inconel cladding layer 35 encircling the opening 12 and such plug is welded in place by fusion of the flange 40 on the plug with the abutting metal of the cladding layer 35 to form an annular curved-ridge weld 42 as shown in cross-section in FIG. 5, and in plan view and outline in FIG. 6. An interior threaded socket 43 opens upwardly from the lower end of the plug 38 to adapt same for threaded connection with the end of a shaft-like removal tool which might be brought into play subsequently should it later be desired to remove the plug 38 for any reason. It will be understood that in such event the weld 42 would first be machined away.

In a typical installation, the diameter of the tube 13 is about three-fourths inch 100, and the outer diameter of the weld 42 is approximately one inch.

In accordance with the prime feature of the present invention, a small diameter cylindrical television camera 45 is employed for observing the weld 42 for inspection purposes. Such a camera may be easily adapted for use with the aforementioned remotely-controlled manipulator apparatus disposed in the channel head 15 and such camera, for example, may be such as the model 1831-30596-1 sold by Edo Western Corporation of Salt Lake City, Utah for use in conjunction with a television monitor (not shown) disposed outside the channel 15. The minicamera 45 includes a television pickup tube 46 of cylindrical configuration and disposed coaxially therein and which has an input tube face of approximately six tenths of an inch and a lens assembly of approximately one-half inch in diameter for focussing images onto such input face 47.

According to the invention, in order to enable the camera tube 46 to observe the annular ridged weld 42 in its entirety, an image-tranformation lens 50 of suitable transparent optical material is provided which is the form of an annulus of concavo-convex transverse cross-section for disposition adjacent to the weld 42 during inspection use and coaxial therewith. The inner peripheral portion of the transformation lens 50 is of lesser diameter than the inner diameter of the annular weld 42 and the outer diameter of such lens 50 is of larger diameter than the outer diameter of the annular weld 42 so that such lens is capable of observing the entire weld from inner edge 52 to outer edge 53, FIG. 6, and functions to produce a flattened expanded image 55 of the weld 42, FIG. 7, having an outer circular edge 56 of larger diameter than the edge 53 of the weld 42 and an inner diameter 57 of lesser diameter than the inner edge 52 of such weld 52. It is this flattened, expanded image 55 of the weld 42 that is observed by the camera lens 48 and focussed onto the input face 47 of the camera pickup tube 46. Accordingly, it will be appreciated that it is this image also that is depicted on the television monitor (not shown) located outside the steam generator.

In one working embodiment in the present invention as including the specific aforementioned miniature television camera, the image transformation lens 50 was made of lucite, and had an outer working diameter of about one and three-eighths inches, and an inner working diameter of about three-sixteenth of an inch. The radius of its annular concave surface was about two inches, and the radius of its annular convex surface was about one half of an inch.

In accordance with an adjunctive feature of the present invention, the transformation lens 50 is mounted on the upper end of a hollow cylindrical light transmitting member 60 which is in turn mounted on the upper end of the cylindrical camera 45. The outer diameter of the light transmissive member 60 is substantially equal to that of the cylindrical camera 45. In the exemplified working embodiment this diameter is approximately one and one half inches and the length of such member 60 is approximately one and seven-eighths inches. The interior of the light transmissive member has a coaxial tapered opening 61 of a diameter equal to the effective diameter of the image transformation lens 50 at its upper end and a diameter equal to approximately that of the input lens 48 for the camera tube 46 at its lower end. Encircling the lower end of the tapered opening 61 is an annular shoulder 62 that is provided with a frosted surface and is exposed to illumination by a circumferential array of small lamps 63 disposed around the lens 48 at the upper end of the camera 45. The light transmissive member 60 may be made of transparent lucite and acts to transmit the light from the lamps 63 as received at its annular shoulder 62 to its upper narrow end encircling the image transformation lens 50 to provide local illumination for the annular weld 42 undergoing observation inspection. Immediate transmission of such light via the member 60 to the site of the weld 42 occurs by way of an outer annular integrally-attached clear portion of the lens 50 seated on the upper end of such member.

While the invention has been shown and disclosed herein in what is conceived to be a practical and preferred embodiment, it is recognized that departures may be made therefrom within the scope of the following claims.

I claim:

1. Apparatus for inspecting annular weld areas, comprising:
   a television camera having a circular camera tube input face and a circular camera input lens means in front of said input face;
   an annular image transformation lens having at least one optical surface rounded in transverse cross section for radialwise magnification of annular areas of observation; and mounting means attaching said image transformation lens in coaxial spaced-apart relationship with said camera input lens means.

2. The apparatus of claim 1, wherein said annular image transformation lens has an inner diameter less than that of said annular weld area and an outer diameter greater than such area.

3. The apparatus of claim 1, wherein said camera includes lamp means and said mounting means is in the form of a hollow light transmitting member exposed to said lamp means for illumination of said weld area.

4. The apparatus of claim 3, wherein said lamp means is in form of an array of miniature lamps encircling said camera input lens.

5. The apparatus of claim 1, wherein said camera tube input face and said input lens are of lesser diameter than the outer diameter of said annular weld area.

* * * * *